United States Patent [19]

Kühl

[11] Patent Number: 4,565,681

[45] Date of Patent: Jan. 21, 1986

[54] SYNTHETIC ZEOLITE ZSM-5 HAVING A DIMETHYLETHYLPROPYLAMMONIUM COMPONENT

[75] Inventor: Günter H. Kühl, Cherry Hill, N.J.

[73] Assignee: Mobil Oil Corporation, New York, N.Y.

[21] Appl. No.: 606,570

[22] Filed: May 3, 1984

[51] Int. Cl.[4] .................... C01B 33/28; B11J 29/06
[52] U.S. Cl. .................... 423/328; 423/329; 423/332; 502/62
[58] Field of Search .................... 423/326–332; 502/60, 77, 62

[56] References Cited

U.S. PATENT DOCUMENTS

| | | | |
|---|---|---|---|
| 3,702,886 | 11/1972 | Argauer et al. | 423/328 |
| 3,709,979 | 1/1973 | Chu | 423/328 |
| 4,287,166 | 9/1981 | Dwyer | 423/329 |
| 4,528,171 | 7/1985 | Casci et al. | 423/329 X |

FOREIGN PATENT DOCUMENTS

| | | | |
|---|---|---|---|
| 0011362 | 5/1980 | European Pat. Off. | 423/329 |
| 0026963 | 4/1981 | European Pat. Off. | 423/329 |

OTHER PUBLICATIONS

B. M. Lok, "The Role of Organic Molecules in Molecular Sieve Synthesis" Apr. 5, 1983, (Zeolites).

Primary Examiner—Edward J. Meros
Attorney, Agent, or Firm—Alexander J. McKillop; Michael G. Gilman; Marina V. Schneller

[57] ABSTRACT

This invention relates to a new and useful improvement in synthesizing crystalline ZSM-5 zeolite and to use of said zeolite prepared in accordance herewith as a catalyst for hydrocarbon conversions. The synthesis utilizes dimethylethylpropylammonium ion as the directing agent.

9 Claims, No Drawings

SYNTHETIC ZEOLITE ZSM-5 HAVING A DIMETHYLETHYLPROPYLAMMONIUM COMPONENT

NATURE OF THE INVENTION

The present invention relates to a method for the preparation of zeolites having the X-ray diffraction pattern characteristic of ZSM-5 zeolite and, more particularly, to a novel process for the preparation of ZSM-5-type zeolites utilizing dimethylethylpropylammonium ion or salt as a directing agent in the synthesis of this zeolite.

PRIOR ART

ZSM-5 zeolite has been the subject of much patent and technical literature in recent years and is disclosed and claimed in U.S. Pat. No. 3,702,886 to Argauer et al, the disclosure of which is herein incorporated by reference. The family of ZSM-5 compositions has the characteristic X-ray diffraction pattern set forth in Table 1, hereinbelow. ZSM-5 compositions can also be identified, in terms of mole ratios of oxides, as follows:

$$0.9 \pm 0.2 M_{2/n}O : W_2O_3 : Y SiO_2 : z H_2O$$

wherein M is a cation, n is the valence of said cation, W is selected from the group consisting of aluminum, boron, iron and gallium, Y is at least 20, and z is from 0 to 40. In a preferred synthesized form, Y may range up to infinity ($\infty$) so that the zeolite has a formula, in terms of mole ratios of oxides, as follows:

$$0.9 \pm 2 M_{2/n}O : Al_2O_3 : 20\text{-}\infty\ SiO_2 : z H_2O$$

and M is selected from the group consisting of a mixture of alkali metal cations, especially sodium, and tetraalkylammonium cations, the alkyl groups of which preferably contain 2-5 carbon atoms.

A primary purpose of this invention is to provide a new directing agent which provides an alternative to the presently used tetraalkylammonium cations.

SUMMARY OF THE INVENTION

In one aspect the novel process of this invention is carried out by replacing the tetrapropylammonium cations conventionally used in the synthesis of zeolite ZSM-5 with dimethylethylpropylammonium cations, derived particularly from halide salts. Although various halides can be used, such as the chloride, the bromide, the iodide, the particularly preferred halide is the bromide. Other aspects of the invention will be readily apparent to those skilled in the art upon reading the following description.

DESCRIPTION OF THE PREFERRED EMBODIMENTS

ZSM-5 can suitably be prepared in accordance with the novel process of this invention by preparing a solution containing the dimethylethylpropylammonium halide salt, previously referred to, sodium oxide, an oxide of silica, and optionally, an oxide of alumina and water, the solution having a composition in terms of mole ratios within the following ranges:

|  | Broad | Preferred |
|---|---|---|
| $SiO_2/Al_2O_3$ | 20–infinity | 30–50,000 |
| $OH^-/SiO_2$ | 0.05–0.4 | 0.1–0.35 |
| $H_2O/OH^-$ | 50–400 | 70–300 |
| $Q/(Q + M)$ | 0.05–0.95 | 0.1–0.9 | wherein Q is a cation derived from a dimethylethylpropylammonium salt and M is an alkali metal ion, and maintaining the mixture until crystals of the crystalline zeolite ZSM-5 are formed. A less preferred range for the mole ratio of silica to alumina is 20 to 100,000. Thereafter, the crystals are separated from the liquid and recovered. Reaction conditions required consist of heating the foregoing reaction mixture to a temperature of from about 120° C. to about 200° C. for a period of time of from about 48 hours to about 20 days. A more preferred temperature range is from about 130° C. to about 180° C. with the amount of time at a temperature in such range being from about 72 hours to about 15 days.

The digestion of the gel particles is carried out until the gel has disappeared. The solid product is separated from the reaction medium, as by cooling the whole to room temperature, filtering and water washing.

Zeolite ZSM-5 possesses a definite distinguishing crystalline structure whose x-ray diffraction pattern shows the following significant lines:

TABLE I

| Interplanar Spacing d(A) | Relative Intensity |
|---|---|
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04 ± 0.2 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |
| 2.94 ± 0.02 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and d (obs), the interplanar spacing in A, corresponding to the recorded lines, were calculated. In Table I the relative intensities are given in terms of the symbols W=Weak, S=Strong and VS=Very Strong. It should be understood that this x-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The composition for the synthesis of ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously.

The ZSM-5 composition as prepared hereby has the characteristic x-ray diffraction pattern of conventionally prepared ZSM-5, the values of which are set forth in Table 1.

Even though the presently prepared ZSM-5 can often have a low amount of alkali metal, e.g. sodium, ions, as synthesized, and therefore can be utilized as catalytic material for a number of hydrocarbon conversion reactions substantially as synthesized, the original cations of the as-synthesized ZSM-5 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum metals of Groups IIA, IIIB, IVB, VIB, VIII, IB IIB, IIA, IVA. Of the replacing metallic cations, particular preference is given to cations of metals such as rare earth, Mn, Ca, Mg, Zn, Cd, Pd, Ni, Co, Ti, Al, Sn, Fe and Co.

A typical ion exchange technique would be to contact the synthetic ZSM-5 zeolite with a solution of a salt of the desired replacing cation or cations. The ZSM-5 zeolite has been previously activated by calcining it in an inert atmosphere, such as nitrogen, at a temperature of 400° C. to 800° C. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251 and 3,140,253.

Following contact with the salt solution of the desired replacing cation, the zeolite is then preferably washed with water and dried at a temperature ranging from 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

Regardless of the cation replacing the cations in the as-synthesized form of ZSM-5, the spatial arrangement of the aluminum, silicon and oxygen atoms which form the basic crystal lattices of ZSM-5 remains essentially unchanged by the described replacement of the original cations as determined by taking an x-ray powder diffraction pattern of the ion exchanged material.

The hereby prepared zeolite ZSM-5 can be used in the conversion of a wide variety of organic compounds, e.g. hydrocarbon compounds and oxygenates such as methanol. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. All of the foregoing catalytic processes are of value since they result in upgrading of the organic charge being processed with methanol, selective toluene disproportionation, methanol to gasoline and p-ethyltoluene production. Selectivity gains in these processes result from the conversion of an undesirable, diffusionally limited intracrystalline product to a smaller, more desirable product whch leaves the crystal more readily with less chance of further reaction. Further reaction is limited by the more diffusionally restrictive large crystal ZSM-5.

In the case of many catalysts, it is desired to incorporate the ZSM-5 hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. the latter may be either naturally occurring or in the form of gelatinous precipitates, sols or gels including mixtures of silica and metal oxides. Use of a material in conunction with the ZSM-5, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaoline. these materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into power-like materials which cause problems in processing.

Naturally occurring clays which may be composited with the hereby synthesized ZSM-5 catalyst include the montmorillonite and kaoline family, which families include the sub-bentonites, and the kaolines commonly known as Dixie, McNamee, Georgia and Florida clays or others in which the main mineral constituent is halloysite, kaolinite, dickite, nacrite, or anuaxite. Such clays can be used in the raw state or initially subjected to calcination, acid treatment or chemical modification.

In addition to the foregoing materials, the ZSM-5 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-5 and inorganic oxide gel matrix vary widely with the crystalline aluminosilicate content ranging from about 1 to about 90 percent by weight and more usually in the range of about 10 to about 70 percent by weight of the composite.

The following examples will illustrate the novel process of this invention.

EXAMPLES

EXAMPLE 1

Aluminum nitrate, $Al(NO_3)_3 \cdot 9H_2O$, (1.6 grams), was dissolved in 163 grams of water; a 51.8% solution of dimethylethylpropylammonium bromide, (35.1 grams), was added, as was subsequently a solution of 5.0 grams of NaOH pellets in 50 grams of water. Finally, 48 grams of a commercial precipitated silica containing about 10% water, 87% silica ($SiO_2$) and 0.5% alumina ($Al_2O_3$) was added. The reaction mixture was heated at 150° C. for 12 days to effect crystallization.

The reaction mixture composition can be summarized as follows in terms of mole ratios:

$SiO_2/Al_2O_3$—155
$DMEPA_2O/(Na_2O+DMEPA_2O)$—0.40
$OH^-/SiO_2$—0.16
$H_2O/OH^-$—120

The crystalline product was filtered, washed with water and dried at ambient temperature. It displayed the x-ray diffraction pattern of ZSM-5 of 60% crystallinity when compared with a reference sample. The sorption capacities, in grams/100 grams at 25° C., were:

Cyclohexane, 20 Torr—5.2
n-Hexane, 20 Torr—10.8
Water, 12 Torr—6.0

The chemical composition of the product was, in weight percent:

$SiO_2$—85.2
$Al_2O_3$—0.90
$Na_2O$—0.93
N—0.94
Ash—88.2
$SiO_2/Al_2O_3$ molar ratio—156

EXAMPLE 2

Sodium hydroxide, (3.1 grams), was dissolved in 60.6 grams of water. A 51.8% solution of dimethylethylpropylammonium bromide, (42.4 grams) was added, followed by 100 grams of colloidal silica sol (30% $SiO_2$). The mixture was digested at ambient temperature for 24 hours and then heated at 150° C. for 9 days. The composition of the reaction mixture in terms of mol ratios can be summarized as follows:

$SiO_2/Al_2O_3$—5100
$DMEPA_2O/(Na_2O+DMEPA_2O)$—0.6
$OH^-/SiO_2$—0.15
$H_2O/OH^-$—111

The crystalline product was filtered, washed with water and dried at ambient temperature. It showed an x-ray diffraction pattern of ZSM-5 of 85% crystallinity, when compared with a reference sample. The sorption capacities, in grams/100 grams at 25° C., were:

Cyclohexane, 20 Torr—2.0
n-Hexane, 20 Torr—11.6
Water, 12 Torr—2.2

The chemical composition of the product was:

$SiO_2$, wt %—86.4
$Al_2O_3$, ppm—476
$Na_2O$, wt %—1.05
N, wt %—0.89
Ash, wt %—87.9
$SiO_2/Al_2O_3$, molar ratio—3086

What is claimed is:

1. A method for synthesizing ZSM-5 crystalline silicate exhibiting a characteristic X-ray diffraction pattern as shown in Table 1 of the specification
   which method comprises preparing a mixture containing a source of silicon dioxide; dimethylethylpropylammonium cation as the only tetraalkylammonium component; a source of alkali metal oxide; optionally a source of alumina; and water, and having a composition in terms of mole ratios, within the following ranges:
   $SiO_2/Al_2O_3$—20 to infinity
   $H_2O/OH^-$—50 to 400
   $OH^-/SiO_2$—0.05-0.4
   $Q/(Q+M)$—0.05-0.95
   wherein Q is dimethylethylpropylammonium cation and M is an alkali metal; and maintaining the mixture at a temperature of from about 120° C. to about 200° C. until crystals of the ZSM-5 crystalline silicate are formed.

2. The method of claim 1 wherein said mixture has a composition, in terms of mole ratios, as follows:
   $SiO_2/Al_2O_3$—30-50,000
   $H_2O/OH^-$—70-300
   $OH^-/SiO_2$—0.1-0.35
   $Q/(Q+M)$—0.1-0.9

3. The method of claim 1 wherein said dimethylethylpropylammonium cation is derived from a compound selected from the group consisting of halide, hydroxide, sulfate, and carboxylate compounds.

4. The method of claim 3 wherein said compound is halide.

5. The method of claim 4 whrein said halide is bromide.

6. A synthetic crystalline silicate produced by the method of claim 28 and having a composition, expressed in terms of mole ratios of oxides, as $$0.9\pm0.2[xQ_2O+(1-x)M_{2/n}O]:Al_2O_3:y\ SiO_2:zH_2O$$

wherein M is an alkali metal having the valence n,
Q is dimethylethylpropylammonium,
X is greater than 0 but does not exceed 1,
y is at least 20
z is between 0 and 40, and wherein the silicate is ZSM-5 and exhibits the X-ray diffraction pattern as shown in Table 1 of the specification.

7. The synthetic crystalline silicate of claim 6 wherein said dimethylethylpropylammonium cation is derived from a compound containing an anionic group selected from the group consisting of halide, hydroxide, sulfate, and carboxylate compounds.

8. The synthetic crystalline silicate of claim 7 wherein said compound is a halide.

9. The synthetic crystalline silicate of claim 6 wherein M is sodium

* * * * *